United States Patent [19]

Miller et al.

[11] Patent Number: 4,738,109

[45] Date of Patent: Apr. 19, 1988

[54] TWO STAGE BRAKE CONTROL VALVE

[75] Inventors: James A. Miller; Roger J. Nelson; Bennie J. Vaughn, all of Cedar Falls, Iowa

[73] Assignee: Deere & Company, Moline, Ill.

[21] Appl. No.: 926,686

[22] Filed: Nov. 4, 1986

[51] Int. Cl.[4] .................................. F15B 15/14
[52] U.S. Cl. ........................ 60/578; 60/547.1; 60/565; 180/6.24
[58] Field of Search .............. 60/547.1, 560, 565, 60/578, 591, 570; 180/6.24, 6.26

[56] References Cited

U.S. PATENT DOCUMENTS 4,642,989 2/1987 Belart ........................ 60/565 X

FOREIGN PATENT DOCUMENTS 0112406 8/1980 Japan ........................ 60/578
2123503 2/1984 United Kingdom ........ 60/578

Primary Examiner—A. Michael Chambers
Assistant Examiner—John C. Fox

[57] ABSTRACT

A two stage brake valve for communicating fluid pressure to a brake assembly. The valve has a stepped cylinder formed therein in which a high volume piston and high pressure valve are slidably located. The piston and valve define high volume and high pressure chambers respectively. A set of passageways through the piston and valve communicate fluid pressure from the high volume chamber to the high pressure chamber and from the high volume chamber to a reservoir. Relief valve elements located in the passageways regulate fluid communication between the chambers and reservoir. A motion responsive relief valve comprising a ring and groove is also disclosed which provides an orifice function and facilitates refilling of the first chamber. One embodiment includes a highly compact relief assembly valve assembly having dual poppets which act to communicate fluid pressure from the first chamber to either the second chamber or the reservoir. The compact nature of the brake valve assembly will also permit incorporation of a differential lock valve assembly in the same valve body.

13 Claims, 4 Drawing Sheets

TWO STAGE BRAKE CONTROL VALVE

BACKGROUND OF THE INVENTION

1. Field of the Invention

This invention relates to brake valves for controlling fluid pressure for a brake system. More specifically, this invention relates to a differential master cylinder or two stage brake valve for supplying high volume and high pressure fluid inputs to a brake system.

2. Description of the Prior Art

The application of brakes in a motor vehicle can be viewed as a two stage process. The first stage is one of taking up the clearance between the brake facing and the disk or rotor element. In the next stage, the facing transmits braking pressure against the cooperating friction element. In the first stage, a high volume of fluid at relatively low pressure is required to quickly take up the clearance. In the following stage, the additional fluid volume demands are low, but pressure must be high to supply sufficient braking force. Therefore, it has become common practice to design brake valves with a large cylinder for supplying high fluid volume and small cylinder for supplying high fluid pressure. The large cylinder supplies a large volume of fluid without excessive pedal travel, while the small cylinder supplies high fluid pressure without excessive pedal force. It is also known to use a relief valve to relieve fluid pressure from the large diameter cylinder once a sufficient pressure rise is sensed in the brake supply lines. Pressure relief of the large cylindrical portion allows higher fluid pressure to be generated in the smaller cylinder section. Various forms of relief valves are known and are located either in the valve body or in the piston members. While it is preferable to locate the relief valve in the piston member and save space in the housing, locating the relief valve in the piston can increase the complexity or limit performance of the relief valve.

Differential master cylinders or two stage brake valves are also used in power braking systems that have manual operating capability. Therefore, it is desirable to have a brake valve arrangement wherein the large cylinder provides a high volume of fluid for the manual mode, but does not interfere with the operation of the brakes in the power mode.

In brake systems for industrial or agricultural equipment, it is also desirable to have independent braking of individual wheels. For example, on a tractor, it is common practice to have a separate brake pedal for each rear wheel. Providing each wheel with independent braking capability requires another brake control valve or master cylinder. Therefore, it is advantageous to minimize the space requirements of each cylinder, thereby reducing the total size of the brake housing. Moreover, vehicles having a differential in the power train are often provided with a differential lock for preventing wheel slip when additional traction is required. It is common practice to have means tied to the braking function for releasing the differential lock when the brakes are applied to either or both rear wheels. In the past, providing these various functions and capabilities has greatly increased the complexity and space requirements for the various control valves used in the brake system.

SUMMARY OF THE INVENTION

It is an object of this invention to provide a brake valve having reduced complexity and space requirements.

It is a further object of this invention to provide a brake valve that uses a high volume chamber to prevent over travel of the brake piston in a power braking mode while venting fluid from the high volume chamber during a manual braking mode.

It is a further object of this invention to provide a multiple cylinder brake valve and a differential lock valve in a common housing.

In one aspect, this invention is directed to a two stage brake valve having a piston and high pressure valve that undergo unitary movement and a multiple relief valve assembly arranged about the interior of the piston and valve.

In another aspect, this invention is directed to a dual relief valve arrangement, located in a brake piston assembly, having cooperating and compact elements that reduce space and supply or relieve fluid pressure in manual or power braking modes.

Other objects and aspects of this invention along with additional details are set forth in the following detailed description of the preferred embodiment and the accompanying drawings.

DESCRIPTION OF THE PREFERRED EMBODIMENT

Figure 1:
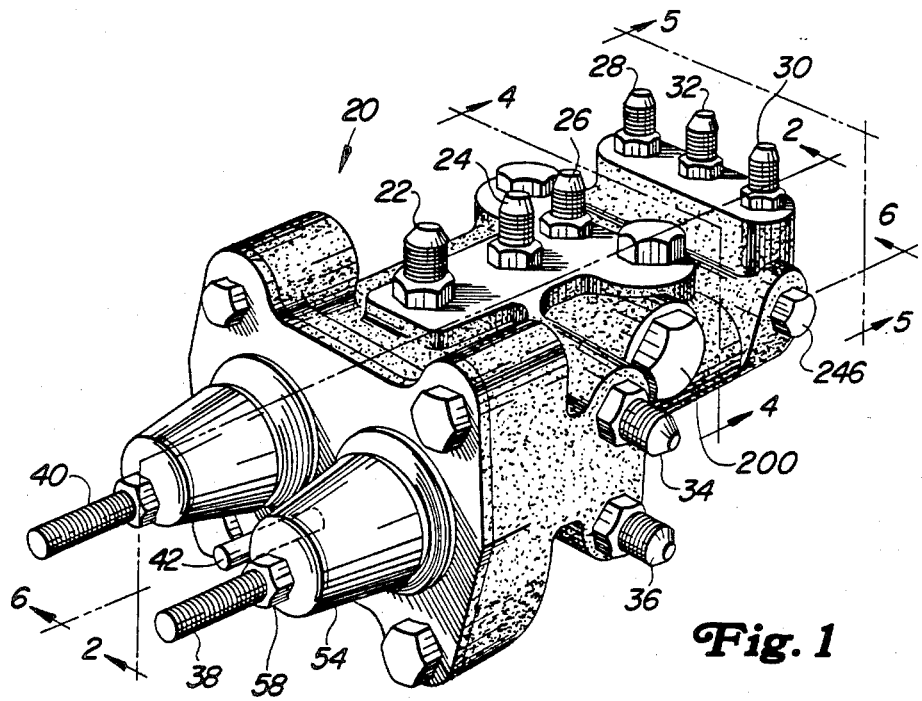
FIG. 1 is an isometric view of the brake housing of this invention.

In its preferred form, shown in FIG. 1 this invention is embodied in a brake valve for a vehicle which includes a valve body 20, having mechanical inputs and fluid input and output connections, for generating and regulating fluid pressure. The vehicle has front wheel brakes, individually controlled rear wheel brakes, a differential for the driving wheels and a differential lock for preventing relative slip between the rear drive wheels. Looking at the fluid connections along the top of valve 20, and starting to the left of FIG. 1, there is a return connection 22 for returning fluid from the valve to a reservoir, a power fluid connection 24 which receives pressurized fluid from a variable displacement pump for activating the brakes in a power mode, a front brake connection 26 for supplying fluid pressure to the front brakes of the vehicle, a pressure signal connection 32, and a left rear brake connection 28 and a right rear brake connection 30 for supplying fluid pressure to the brakes of the wheels associated therewith. There are two connections on the side of the valve, a high pressure connection 34 for receiving high pressure fluid from the transmission pump of the vehicle and a differential lock connection 36 for transmitting fluid pressure to the differential lock. A pair of brake operating rods 38 and 40 for operating a right and a left brake cylinder, respectively, extend from the back of the valve body. Also extending from body 20, at a location between and below the operating rods is a differential lock control rod 42.

Figure 3:
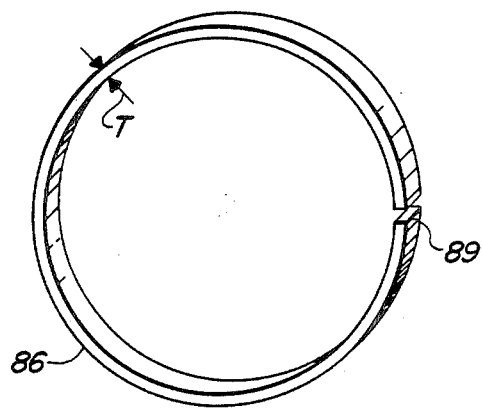
FIG. 3 shows a split ring element of the valve.
Figure 2:
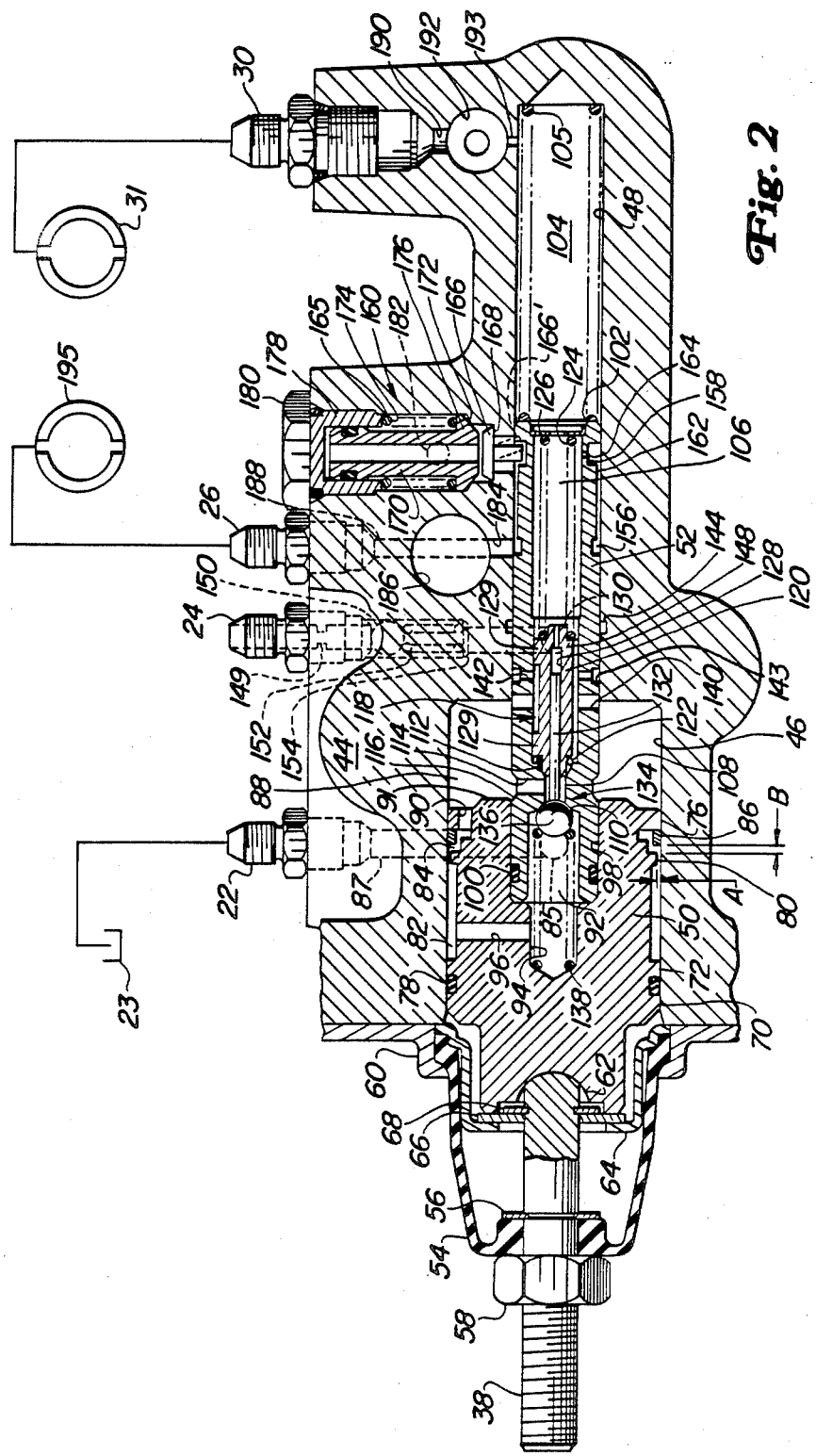
FIG. 2 is a section taken through line 2—2 of the housing showing the right brake cylinder.

FIG. 2 shows a cross section of the right brake cylinder taken along section lline 2—2 in FIG. 1. The following description describes only one brake cylinder, since the left and right brake cylinders are substantially the same. The brake valve housing, generally indicated as 44, defines a large diameter cylinder 46 and a small diameter cylinder 48 which are centered and connected about a common axis and have a piston 50 and a high pressure valve 52 located, respectively, therein. Except for grooves and passages, as hereinafter described, the diameter of piston 50 and valve 52 are sized to block fluid flow between their outer circumference and adjacent cylinder walls. Starting, with respect to FIG. 2, at the left end of the cylinder 50, operating rod 38 is coaxially aligned with cylinder 40. A brake rod boot 54 surrounds rod 38 and is secured by a retaining ring 56, that abuts a hexagonal shoulder 58 on the rod. The end of boot 54 nearest the brake housing 44 is fixed in a brake boot cover 60. Brake boot cover 60 is in turn secured to the back of brake housing 44 with the cover and boot providing a seal to prevent contamination from entering the brake valve. An inner end of rod 38 contacts a semispherical pocket 62 of piston 50. A stop 64 for the brake operating rod 38 limits its outward movement by contacting a washer 66 through which the rod 38 passes, the washer in turn abutting a snap ring 68 which is locked about a groove adjacent the contact end of rod 38. Piston 50, which is normally urged outward by a spring 105, also abuts washer 66 and has its outward travel limited directly by contact with the washer or rod 38. A series of lands comprising a set of rear lands 70 and 72, an intermediate land 80 and a forward land 76 are formed around the periphery of piston 50. Lands 70 and 72 retain an O-ring 78 therebetween to prevent leakage out the back of piston 50. Land 80 divides the remaining cylindrical surface of the piston 50 into a return groove 82 and a ring groove 84. Grooves 82 and 84 communicate with a return passage 85 which communicates with return connection 22 via a passage 87. Return connection 22 is connected to a reservoir 23. Passage 87 extends downward past passage 85 and communicates with a hereinafter described differential lock valve (see FIG. 6). Intermediate land 80 has an outer diameter slightly smaller than the inner diameter of large cylinder 46 which leaves a radial clearance A between the end of the land and the cylinder wall for communicating fluid between grooves 82 and 84. Groove 84 retains an orificing ring 86 having a width slightly less than groove 84 so that an axial clearance B is provided between the ring and the groove. Groove 84 and ring 86 together comprise a motion responsive restrictor valve. Ring 86 is a split compression ring that frictionally engages the wall of large cylinder 46. FIG. 3 shows the curvature of ring 86 and gap 89 about which the ring is split. The ring also has a thickness T which exceeds clearance A.

The front face 91 of piston 50 and the right end of large cylinder 46 define a high volume chamber 88. A series of axial holes 90 about face 91 communicate chamber 88 with valve groove 84. The center of piston 50 is hollowed out into a blind step bore 92 opening about piston face 91. A smaller diameter section 94 of blind bore 92 communicates with return groove 82 across a passageway 96. A larger diameter section 98 of bore 92 receives the left end of the high pressure brake valve 52. The left end of valve 52 has an O-ring groove containing O-ring 100 which seals the space between large diameter bore section 98 and the outside of valve 52.

High pressure valve 52 passes through chamber 88 and extends into small diameter cylinder 48. The right face 102 of valve 52 and the right end of small diameter cylinder 48 define a high pressure chamber 104. Spring 105, located in chamber 104, acts against the right end of small cylinder 48 and face 102 of the high pressure valve to urge the valve and piston to the position shown in FIG. 2. A through bore 106 passing through the center of valve 52 communicates chamber 104 with bore section 94. Bore 106 has a neck section 108 adjacent the plane of piston face 92 with a pair of valve seats 110 and 112 on the left and right sides, respectively. Neck 108 communicates with chamber 88 through a passageway 114 located just to the right of piston face 91. Passage 114 opens into valve 52 and maintains communication between chamber 88 and passageway 114 until piston face 91 contacts the right end of large cylinder 46.

Valve seat 112 forms part of a check valve 118 for communicating fluid pressure from chamber 88 to chamber 104. Check valve 118 comprises a poppet 120 having an O-ring 122 which is urged into contact with valve seat 112 by a spring 124. Poppet 120 has a significantly smaller diameter than through bore 106 to allow fluid communication around the poppet. Poppet 120 also has three equally spaced steps 129 at both its back and front ends which extend outward and guidingly contact the inside of through bore 106. Spring 124 acts against the right end of poppet 120 and an open centered spring retainer 126 secured to the right end of valve 52. A pin bore 128 extends through the center of the poppet member. A pin 132 is located in bore 128 and has a diameter sufficient to block fluid communication through the bore. Pin 132 is blocked against rightward movement out of the bore by a reduced diameter section 130.

Pin 132 is part of a relief valve 134 for communicating fluid pressure from chamber 88 to blind bore 92 and ultimately to the return connection 22. The remainder of relief valve 132 comprises a check ball 136 which is urged into contact with valve seat 110 by a spring 138, spring 138 acting against the opposite side of the check ball and the closed end of the bore 92. Pin 132 and check ball 136 are in axial alignment so that the pin can contact the check ball.

Proceeding to the right, from groove 116, along the periphery of valve 52 there are a series of passageways that communicate the outer surface of valve 52 with through bore 106. A first set of passageways 140 communicates the chamber 88, when positioned therein, with the bore 106. To the right another set of passages 142 and an interconnected annular groove 143 together communicate bore 106 with an annular groove 144 when aligned therewith. Annular groove 144 intersects a power passageway 148 which communicates with power fluid connection 24. Fluid flow through passageway 148 is regulated by an orifice 149 in connection 24. Passageway 148 is enlarged adjacent inlet 24 to accommodate a check valve assembly comprising a check ball 150 which is biased against a valve seat on connection 24 by a spring 152, spring 152 acting against the check ball and a shoulder 154. Continuing rightward from groove 143, brake valve 52 has an annular groove 156 for communicating fluid pressure to the front brakes and an annular groove 158 for upsetting a lifter 166 of an equalizer assembly 160. Between grooves 156 and 158, the diameter of the valve is reduced to form a groove 162 that communicates grooves 156 and 158. An orifice opening 164, in the bottom of equalizer groove 158, communicates groove 158 with through bore 106.

Groove 158 has the stem of a valve lifter 166 extended therein for unseating a poppet 170 of the equalizer valve assembly 160. Equalizer assembly 160 is disposed in a multistepped bore 165. Equalizer poppet 170 is biased against a valve seat 172, which forms a seat for poppet 170, by a spring 174. Spring 174 acts against a ledge 176 of the poppet valve and an annular extension 178 of an equalizer plug 180. Equalizer plug 180 seals the outer end of bore 165 while the extension 178 guides the non-sealing end of poppet 170. Valve lifter 166 rests on a shoulder 168 until upset by forward movement of valve 52 to a position 166' where it unseats poppet 170 and allows communication of fluid pressure past the poppet to an equalizer port 182. Port 182 communicates equalizer assembly 160 with a substantially identical equalizer assembly for the left brake cylinder through a passageway and port not shown.

Brake valve 44 houses additional flow regulation devices in a shuttle assembly bore 186 and a check bore 192. Rightward movement of valve 52 registers front brake groove 156 with one end of a shuttle assembly passageway 184, passageway 184 communicating shuttle assembly bore 186 with front brake groove 156. Shuttle assembly bore 186 communicates with front brake connection 26 via a passageway 188. A passage 190 at the right end of small diameter cylinder 48 communicates chamber 104 with connection 30 of the right rear wheel brake 31. Passage 190 also intersects check bore 192. An orifice 193 regulates fluid flow across passage 190 between check bore 192 and chamber 104.

Figure 4:
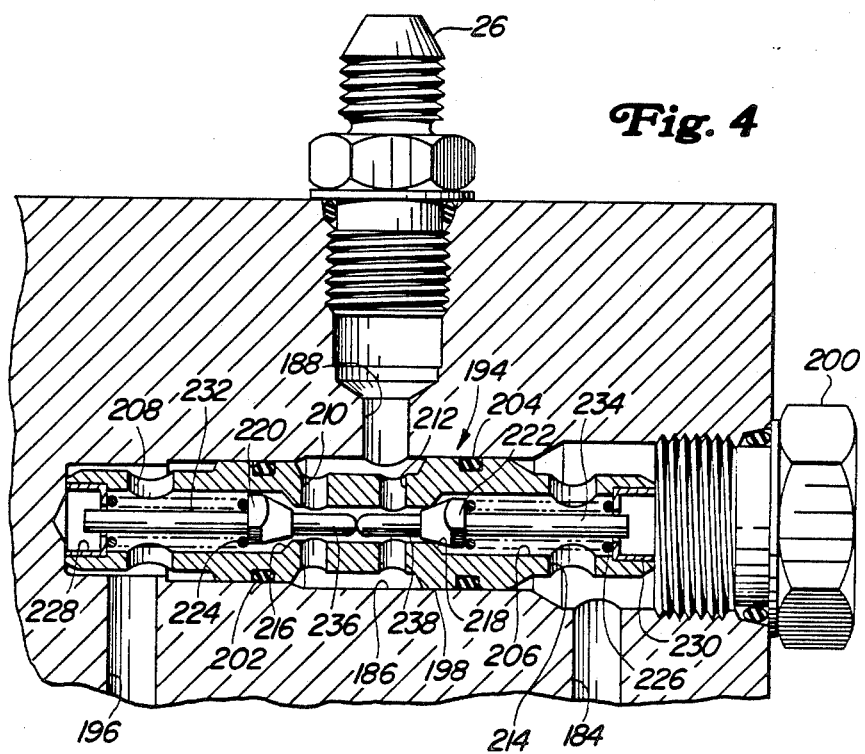
FIG. 4 is a section taken through line 4—4 of FIG. 1, showing a shuttle valve assembly.

Shuttle bore 186 contains a shuttle valve assembly 194 for the front brakes 195 and is shown in FIG. 4. The right end of bore 186 communicates with the previously described section of the right brake cylinder via passageway 184 and the left end of bore 186 communicates with a similar section of the left brake cylinder via a passageway 196. Shuttle valve assembly 194 only allows communication of fluid pressure to the front brakes, via passage 188 and connection 26, when there is fluid pressure from both brake valves. The shuttle valve assembly has a sleeve 198 which is held in bore 186 by a plug 200. Plug 200 also seals the open end of bore 186. A pair of O-rings 202 and 204 retained in grooves about the periphery of sleeve 198 sealingly divide the bore into three sections that communicate with passageways 184, 188 and 196, respectively. The sleeve has a central bore 206 which is intersected by a passageway 208 communicating the left end of bore 206 with passagway 196; passageways 210 and 212 which communicate the center of bore 206 with passageway 188; and a passageway 214 for communicating passage 184 with the right end of bore 206. The center of bore 206 necks down to define a valve seat 216 and a valve seat 218 about the bore on opposite sides of passages 210 and 212, respectively. A pair of poppet valves 220 and 222 are axially aligned in bore 206 and biased towards each other and valve seats 216 and 218, respectively, by a pair of springs 224 and 226. Springs 224 and 226 act against poppets 220 and 222, respectively, and a set of plugs 228 and 230, located at opposite ends of bore 206. Guide rods 232, 234 extend back from the head of each poppet through its biasing spring and its associated plug. Each poppet has a nose 236, 238 extending from its head into the necked down section of bore 206, the two noses have a combined length that will not permit both poppets to be seated on their respective valve seats at the same time.

The check bore 192 contains a check assembly 240, shown in FIG. 5, for supplying fluid pressure to a hereinafter described differential lock valve via a passageway 256 and to pressure signal connection 32 via a passageway 254. Assembly 240 also prevents communication between passageway 190 and passageway 252 unless fluid pressure in both passageways is equal. The assembly consists of a check shuttle 242 movably located in bore 192 between a shoulder 244 which forms a first valve seat and the end of a plug 246 having a second valve seat 248 located about the opening to a blind bore 250 which is formed in plug 246. Communication of fluid pressure between the outside of plug 246 and the inside of bore 192 is prevented by an O-ring 251 which seals the space between the plug and bore 192. A passageway 253 transversely intersects blind bore 250 and communicates bore 250 with the right end of bore 192. Bore 192 connects right brake passageway 190 with a passageway 252 which serves the same function for the left brake valve as passageway 190 serves for the right brake valve. Passageways 254 and 256 intersect a section of bore 192 lying between valve seat 248 and shoulder 244. The highest fluid pressure from either brake valve is communicated by passageway 254 to the pump to signal increased pressure demand, and by passageway 256 to a hereinafter described differential valve.

Figure 6:
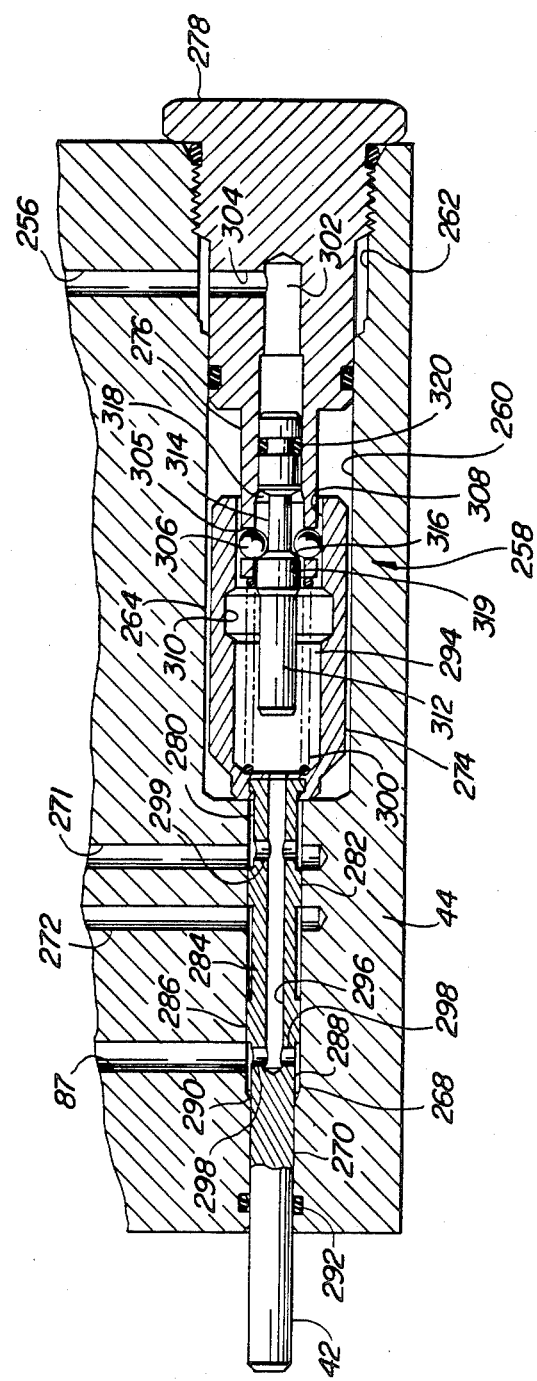
FIG. 6 is a section taken along line 6—6 of FIG. 1 and shows a differential control valve.

A differential lock valve 258 is shown in FIG. 6. The differential lock valve is located in a bore 260 which is defined by brake valve housing 44, with the bore having sections 262, 264, 268 and 270 which are characterized by decreasing diameters. Passageway 256 communicates with the largest diameter bore section 262. A pair of passageways 271 and 272, shown partially in FIG. 6, communicates with bore section 268. Passageways 271 and 272 also communicate with outlet connection 36 and high pressure connection 34, respectively (see FIG. 1). Bore section 268 is also intersected by return passage 87. The differential valve includes a lock coupler 274 which is attached to differential lock control rod 42 at one end and has a chamber 294 at its opposite end. Chamber 294 at least partially surrounds a projecting sleeve 276 of a differential lock plug 278. Pressure passage 272 registers continually with an annular groove 284, located about the outside of rod 42 and defined by a land 282 on its right side, and a land 286 on its left side. An annular groove 280 is defined on the outside of rod 42 by the left end of lock coupler 274 and land 282. Passage 271 registers with annular groove 280 when rod 42 is in a leftward position as illustrated, or groove 284 when the lock coupler and rod are moved to the right. Return passage 87 communicates with a chamber 288, chamber 288 being defined by land 286 and a shoulder 290. An O-ring 292 retained in an annular groove about bore section 270 seals the area between bore section 270 and the outside of rod 42. Chamber 294 communicates with chamber 288, via an internal bore 296 and a transverse passageway 298, and with the groove 280 by a transverse passage 299. A spring 300, located in chamber 294, acts against the right end of sleeve 276 and the left end of the chamber to urge the lock coupler to the left and rod 42 out of the valve body.

Valve plug 278 has a blind bore 302 and a passage 304 at its closed end that communicates bore 302 with passageway 256. Blind bore 302 opens about the end of sleeve 276 and has a series of openings 305 spaced just inward of the end of the sleeve that guide a series of two lock balls 306. Radial positioning of the balls with respect to the centerline of the sleeve is controlled by contact with either a large diameter section 310 or a small diameter section 308 of chamber 294. The diameter of section 310 allows the lock balls, when aligned therewith, to move radially outward past the wall of blind bore 302.

Lock balls 306 cooperate with a differential lock pin 312. The pin has a neck portion 314 defining a set of stops 316 and 318 at its opposite ends and a land 319 adjacent to stop 316. Stop sections 316 and 318 will limit relative movement between sleeve 276 and pin 312 when section 308 of the lock coupler chamber is in contact with lock balls 306. The lock pin also has an O-ring 320 that engages the walls of blind bore 302 and prevents leakage between the pin and the adjacent bore.

OPERATION

The operation and interaction of the previously described components will now be described. The valve has two basic modes of operation, a power mode where pump generated fluid pressure or power fluid is available and the brake valve primarily controls fluid flow from the power source to the brakes and a manual mode where power fluid is not available and fluid pressure for braking is generated in the brake valve. For both the power and manual mode, the piston 50 and valve 52 begin in the same initial position as shown in FIG. 2. In this position, piston 50 is moved fully leftward and restrained against further movement by brake operating rod stop 64 and chamber 88 communicates with return passage 87 via return passage 85, groove 84, and holes 90.

In the power mode, communication of power fluid from passage 148 is, at first, blocked by the outside of brake valve 52. In order to initiate braking of the right wheel, the operator pushes operating rod 38 rightward, through an appropriate linkage, thereby initiating rightward movement of the piston and valve. As the piston moves rightward, orificing ring 86 remains fixed against the wall of large cylinder 46 so that clearance B is taken up and fluid flow to return passage 87 is restricted by an orifice formed by clearance A and gap 89. At the same time, compressing chamber 88 transmits fluid across passageway 140 into through bore 106 where it is combined with fluid from chamber 104 and the combined flow ultimately communicated to right brake connection 30. Eventual movement of passageway 140 to the right of chamber 88 blocks communication of fluid pressure from chamber 88 across passage 140, raising the pressure in chamber 88 and the force needed for further rightward movement of the piston. After blockage of passageway 140 fluid pressure in chamber 88 is relieved across gap 89 of ring 86 and radial clearance A or, if fluid pressure rises quickly, by check valve 118. Slight additional rightward movement registers groove 143 and passage 148 and communicates power fluid thereacross. The communication of power fluid to bore 106 supplies enough fluid volume to take up any remaining clearance between the brake elements and supplies the necessary pressure for adequate braking force. As fluid flows out of bore 106, orifice 193 serves to restrict fluid flow out of chamber 104, causing pressure build-up and preventing overtravel. Power fluid in bore 106 acts against the right end of poppet 120 sealing the O-ring 122 against the seat 112 and blocking further communication between chamber 88 and through bore 106. This additional pressure helps prevent over travel of the valve by the operator during the initial stage of piston movement while still providing a volume of fluid for moving the friction elements of the brakes toward a contact position. Gradual rightward movement of cylinder 50 can continue as fluid is allowed to pass across the gap 89 in ring 86 and on to the return port. Rapid rightward movement of piston 50 will raise fluid pressure on the right side of check ball 136 which, together with a force proportional to the pressure in bore 106 from pin 132, will unseat check ball 136. Unseating check ball 136 greatly increases the flow area between chamber 88 and return line 87 and limits the brake pedal resistance during the power mode. Therefore, rightward travel of the piston 50 and valve 52, in the power mode, is generally limited to that necessary to register groove 143 and passage 148.

Movement of valve 52 in the power mode is sufficient to displace valve lifter 166 of equalizer assembly 160 to position 166' and communicate fluid pressure from grooves 158 and 162 across valve 170 and on to equalizer port 182. However, a similar equalizer valve associated with the left brake cylinder prevents communication of fluid pressure between the brake cylinders until the left brake valve is moved rightward to unseat its equalizer valve. When both brake valves are operated, communication of fluid pressure between the equalizer valves equalizes pressure in both brake cylinders.

Fluid pressure is also communicated from groove 156 to shuttle passageway 184. Fluid from passageway 184 is communicated to shuttle assembly 194 (see FIG. 4) and into the section of bore 186 lying to the right of O-ring 204. In the absence of fluid pressure from passageway 196, fluid pressure from passagway 184 urges poppet 222, with the assistance of spring 226, against valve seat 218 to prevent communication of fluid pressure into front brake connection 26 or passage 196. Simultaneous braking of the right and left wheels generates fluid pressure in passageway 196 which, due to the previously described communication across the two equalizer valves, is equal to fluid pressure in passageway 184. Since nose portions 236 and 238 will not allow both poppets 220 and 222 to be seated at the same time, fluid pressure from one or both of passages 184 and 196 is communicated across valve seats 216 or 218, and ultimately to front brake connection 26. Thus, when both brakes are simultaneously activated and the brake valve operates in the power mode, fluid pressure is communicated to the front wheel brakes to increase braking power.

Figure 5:
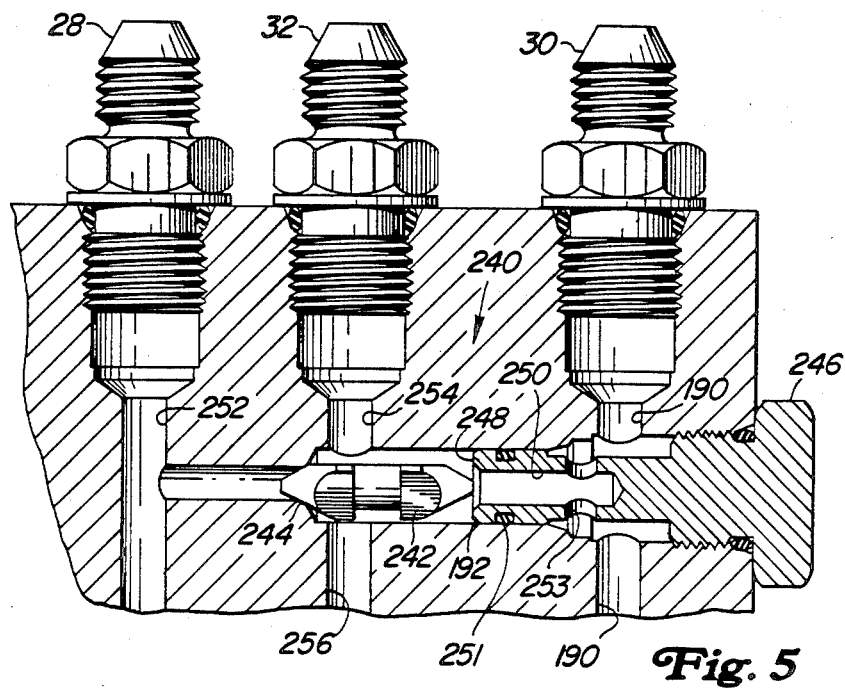
FIG. 5 is a section view taken along line 5—5 of FIG. 1 showing a check assembly.

Fluid pressure communicated from chamber 104 across passageway 190 is also sensed in bore 192 and check assembly 240 (see FIG. 5). Fluid pressure from passageway 190 is communicated across passageway 253 into blind bore 250 and acts against the right end of shuttle check 242, urging the check against the valve seat 244 into a sealing relationship therewith. As a result, communication of fluid pressure between passageways 190 and 252 across bore 192, and ultimately between the right and left brake cylinders is prevented. Nevertheless, the shuttle check still permits communication of fluid pressure to passageways 256 and 254. When both brake cylinders are pressurized, fluid pressure is communicated from either or both of passages 252 and 190 to passages 256 and 254. Passages 254 supplies fluid for a pressure signal that is transmitted to the hydraulic pump. Responsive to the signal, output from the pump increases to meet the fluid demands of braking.

Fluid pressure from passage 256 is communicated to bore 262, of differential lock valve 258, (see FIG. 6) and urges the lock valve to a disengaging position. An operator engages differential lock valve 258 manually by rightward movement of control rod 42. FIG. 6 shows the valve in a disengaging position wherein the outlet passageway 271, which communicates fluid pressure for locking the differential, communicates with return passage 87 via bore 296 and transverse passageways 298 and 299. By pushing rod 42 into the housing the operator urges grooves 284 and 280 to the right along with lock coupler 274. In this position bore 296 is still communicated with return line 87, however, passageway 272 communicates high pressure fluid from the transmission of the vehicle across groove 284 to passageway 271 and ultimately to the clutches of the differential lock. Rightward shifting of the lock coupler also registers lock balls 306 with enlarged bore section 310 and moves lock pin 312 rightward by contact with the left end of chamber 294. Movement of pin 312 positions land 319 underneath the lock balls to extend the lock balls into the enlarged section 310 and hold the lock coupling in a rightward position against the urging of spring 300. The valve will stay in this engaging position until fluid pressure from passage 256 is communicated to bore 302 via passage 304.

Fluid pressure in bore 302 moves lock pin 312 leftward and registers the lock balls with neck 314 allowing the balls to move out of enlarged portion 310 thereby permitting leftward movement of the lock coupling and control rod. Leftward movement of lock pin 312 continues until stop 318 contacts the lock balls 306. As the lock coupling moves leftward urged by spring 300, the wall of section 308 displaces the balls inwardly into an interfering relationship with stops 316 or 318. Consequently whenever the differential lock is engaged it is automatically disengaged by application of either or both brakes, in the power or manual braking mode.

Returning to FIG. 2, in the manual mode the operator initiates braking by again pushing rod 38 to the right through an appropriate linkage. Under the manual mode the initial movement of the brake piston 50 and brake valve 52 produces the same results as described for the power mode. Once passage 140 has moved past the right end of chamber 88, communication of fluid pressure from chamber 88 continues through bore 106 by the unseating of poppet 120. Fluid flows along the previously defined path from bore 106 to connections 30 and 32, with chamber 88 supplying a high volume of fluid to take up clearance in the right brake elements. Any communication of fluid to inlet passage 148 is blocked from escaping through inlet 24 by check ball 150 and spring 152. As fluid pressure rises during the initial contact stage between the elements, the increased pressure acts against the back of poppet 120 urging O-ring 122 against seat 112. This allows the operator to generate higher fluid pressure over the smaller area of valve 52 and keeps the required pedal force within an acceptable range. As long as the fluid transfer rate out of chamber 104 is kept low, sufficient fluid can be vented from chamber 88 through gap 89 in the ring 86 to keep the required pedal force at an acceptable level. If braking occurs more quickly, increased pressure in chamber 88 together with the pressure proportional force at the left end of pin 132 acts against the right face of check ball 136 to unseat the check ball and relieve excess pressure in chamber 88. Therefore additional force at the brake pedal can go to increase pressure in chamber 104. All fluid pressure for braking is communicated through passage 190 across bore 192. As fluid pressure is communicated to the bore 192 check assembly 240 (FIG. 5) operates in the same manner as hereinbefore described. Similarly the equalizer assembly 160 operates in conjunction with the equalizer assembly for the left brake valve in the manner hereinbefore described.

In the manual mode fluid pressure is not communicated to shuttle valve assembly 194. Without the addition of power fluid, piston 50 and brake valve 52 have greater rightward travel. This increased travel positions power braking groove 156 to the right of shuttle passage 184 such that the land between groove 156 and groove 142 blocks communication of fluid pressure. Therefore, fluid pressure is not made available to the front brakes during manual braking for either brake valve. The valve is arranged to restrict front wheel braking during the manual mode so that more fluid is available for the rear wheel brakes.

Following either manual or power braking modes, the valve is refilled with fluid during the return of the piston 50 and valve 52 to the leftward position shown in FIG. 2. In the absence of force from rod 38, spring 105 acts against the right end of brake valve 52 to urge the piston and valve leftward. Initial leftward movement of the valve creates low pressure in chambers 88 and 104. In this low pressure condition fluid can flow to chamber 104 either across valve seat 112, or back from the friction elements (not shown) through passage 190. As the valve moves leftward, ring 86 is engaged against the wall of large cylinder 46 and moves rightward relative to piston 50, thereby forming clearance B between land 80 and ring 86. Clearance B gives groove 84 constant communication with return passage 87, thereby allowing a large volume of fluid to enter chamber 88 through openings 90. In this manner ring 86 operates to allow rapid refilling of chamber 88 during retraction of the piston and valve while providing a relief function through gap 89 (see FIG. 3) during the brake application.

The description of this invention in the context of a preferred embodiment is not intended to limit the invention to the particular details disclosed herein.

We claim:

1. A two stage brake valve for communicating fluid pressure to at least one set of friction elements of a brake system comprising:
   a valve body;
   a stepped bore within said body having large and small diameter sections;
   an assembly, slidably positioned within said bore, including a piston having an end extending at least partially into said large diameter section and a pressure valve having an end extending at least partially into said small diameter section;
   a first fluid chamber defined by the extending end of said piston and the larger diameter section;
   a second fluid chamber defined by the extending end of said pressure valve and the small diameter section, said second chamber being in fluid communication with at least one set of friction elements of said brake system;

a first passageway for communicating said first chamber with said second chamber;

a second passageway, at least partially defined by said assembly, for communicating said first chamber with a reservoir;

a relief valve located in said assembly and positioned to bypass said second passageway, said relief valve opening in response to fluid pressure in said first and second chambers; and means to bypass at least part of said first passageway for decreasing resistance to fluid flow between said first chamber and said second chamber in response to a positive pressure differential between said first and second chambers.

2. The brake valve of claim 1 wherein means are provided for preventing relative axial movement between said piston and pressure valve.

3. The brake valve of claim 1 wherein a third passageway for communicating said first chamber and said reservoir is routed through said piston, the portion of said third passageway located in said piston including a motion responsive restrictor valve for restricting fluid flow through said third passageway when said piston moves toward said second chamber.

4. The brake valve of claim 3 wherein said motion responsive restrictor valve comprises a land extending around the periphery of said piston and an annular ring extending around said piston, said ring being engageable with the land to vary the flow area of said third passageway in response to the direction of piston travel.

5. The brake valve of claim 1 wherein said means for decreasing flow resistance includes a bore in said assembly having a shoulder dividing the bore into first and second parts, and a poppet valve located in said bore having one end resiliently biased against said shoulder to block fluid flow through said bore until pressure in said second part exceeds the pressure in said first part.

6. The two stage brake valve of claim 1 wherein, said assembly has a central bore divided into first and second parts, a first valve seat and a second valve seat are provided between said parts, said relief valve includes a first poppet element resiliently biased against said first valve seat and a second poppet resiliently biased against said second valve seat to provide said means for decreasing flow resistance, said second poppet having a pin bore and a pin located therein, said pin having one end in contact with said first poppet element and fluid pressure from said second chamber acting on the opposite end of said pin with said fluid pressure acting to unseat said first poppet element.

7. The brake valve of claim 1 wherein said valve body has: first and second stepped cylinders for independently actuating separate sets of brakes and a differential lock valve, said lock valve including means for interrupting communication of fluid pressure from said valve in response to actuation of either of said brakes.

8. The brake valve of claim 1 wherein said brake valve has first and second stepped cylinders for independently actuating separate sets of brakes and for conjointly actuating a third set of brakes via a shuttle check valve, said shuttle check valve allowing fluid communication between said cylinders and said third set of brakes when said cylinders are acting conjointly and interrupting fluid communication otherwise.

9. A two stage brake valve for a brake system comprising:

a valve body;

a stepped bore within said body having large and small diameter sections;

a pressurizing assembly, slidably positioned within said bore, including a piston having an end extending at least partially into said large diameter section and a pressure valve having an end extending at least partially into said small diameter section;

a first chamber defined by the extending end of said piston and the large diameter section;

a second chamber defined by the extending end of said pressure valve and the small diameter section;

a first passageway communicating said first chamber with a reservoir;

a second passageway communicating said second chamber with friction elements of said brake system;

a through bore in said pressure valve having a first valve seat, and a second valve seat spaced axially away from said first valve seat along said through bore in a direction proceeding away from said first chamber;

a first relief valve comprising a first poppet member, said poppet member being resiliently biased against said first valve seat and having a pin bore passing therethrough;

a second relief valve comprising a second poppet member resiliently biased against said second valve seat and a pin slidably disposed within said pin bore, said pin blocking fluid communication through said through bore and having one end in communication with fluid pressure from said second chamber and its opposite end arranged to contact and urge said second poppet member;

means for communicating fluid pressure from said first chamber to a section of said through bore located between said valve seats;

a blind bore in said piston communicating with said through bore; and a third passageway communicating said blind bore with said reservoir.

10. A two stage brake valve for a brake system comprising:

a valve body;

a stepped cylinder within said body having a first large diameter section and a second small diameter section;

a piston slidably disposed within said large diameter section, the end of said piston defining a first chamber within said large diameter section, said piston having a first land about its circumference blocking communication between said first chamber and a circumferential section of said large cylinder section, a blind bore opening to said first chamber, a first passageway communicating said blind bore with said circumferential section, a second land extending around said piston in said circumferential section, said second land having a diameter significantly less than the diameter of said first land, an annular groove defined by said first and second lands and a second passageway communicating said groove with said first chamber;

a third passageway communicating said circumferential section with a reservoir;

a pressure valve, slidably disposed within said small diameter section having one end extending into said first chamber and said blind bore, the opposite end of said pressure valve and said small diameter section defining a second chamber, said pressure valve including a through bore communicating said blind bore and said second chamber, a neck section in said through bore defining first and second valve seats on opposite ends of said neck section, and a fourth passageway for communicating said first chamber and said neck section;

a fifth passageway communicating said second chamber with friction elements of said brake system;

a first relief valve regulating pressure drop from said first chamber to said second chamber, comprising a first poppet having a pin bore passing therethrough and a first spring, said first spring urging said first poppet against said first valve seat;

a second relief valve regulating pressure drop from said first chamber to said blind bore, comprising a second poppet member, a second spring urging said second poppet against said second valve seat, and a pin slidably disposed in said pin bore and blocking fluid flow thereacross, said pin having one end exposed to fluid pressure from said second chamber and the opposite end arranged to contact said first poppet; and a restrictor valve comprising an annular ring disposed in said groove and slidably engaging the large diameter section of said cylinder, said ring having a width significantly less than the width of said groove and an inside diameter less than the diameter of said second land such that said ring restricts fluid flow over said second land when in contact therewith.

11. The brake valve of claim 10 wherein a third spring acts against an end of said second chamber and said opposite end of said pressure valve to urge the extending end of said pressure valve into said blind bore.

12. The brake valve of claim 10 wherein said first spring supplies a lower spring force than said second spring.

13. The brake valve of claim 10 wherein said ring defines an orifice therein for constantly communicating said groove with said reservoir.

* * * * *